United States Patent [19]

Jurowski et al.

[11] 4,014,061
[45] Mar. 29, 1977

[54] VEHICLE WIPER BLADE CONSTRUCTION

[75] Inventors: Willi Jurowski; Alfred Kohler; Hans Prohaska, all of Bietigheim; Eugen Schrade, Ludwigsburg, all of Germany

[73] Assignee: SWF-Spezialfabrik fur Autozubehor Gustav Rau GmbH, Germany

[22] Filed: Aug. 22, 1975
(Under Rule 47)

[21] Appl. No.: 606,979

[30] Foreign Application Priority Data

Aug. 22, 1974 Germany .......................... 2440179

[52] U.S. Cl. .......................... 15/250.42; 15/250.32
[51] Int. Cl.² .......................................... B60S 1/04
[58] Field of Search .................... 15/250.31–250.42

[56] References Cited
UNITED STATES PATENTS

| | | | |
|---|---|---|---|
| 1,684,477 | 9/1928 | Demand | 15/250.36 |
| 1,853,715 | 4/1932 | Anderson | 15/250.36 X |
| 1,860,971 | 5/1932 | Winter | 15/250.32 |
| 2,694,827 | 11/1954 | Bacher | 15/250.32 |
| 2,925,616 | 2/1960 | Krohm | 15/250.32 |
| 3,179,969 | 4/1965 | Glynn | 15/250.32 |
| 3,881,213 | 5/1975 | Tilli | 15/250.42 |

FOREIGN PATENTS OR APPLICATIONS 518,920   3/1940   United Kingdom ............ 15/250.36

*Primary Examiner*—Peter Feldman
*Attorney, Agent, or Firm*—McGlew and Tuttle

[57] ABSTRACT

A vehicle wiper blade comprises a yoke which is advantageously made of a plastic material and is provided with means such as a mounting pin for pivotally mounting it on a wiper arm. The underside of the yoke includes downwardly extending and laterally offset pairs of depending arms which extend downwardly and inwardly from respective sides of the yoke to form a supporting surface spaced from the bottom of the yoke. A wiper blade includes a web portion with a flat surface which is disposed between the support surface and the bottom of the yoke and a blade which projects downwardly between the supporting elements of the yoke for engagement with the windshield. A spring member is inserted between the web of the blade and the bottom of the yoke and both the spring member and the table web portion are provided with a cutout area which aligns beneath a slot defined through the yoke. A locking clip is inserted into the slot and into the cutout area of the spring and the blade and is resiliently engaged with the yoke and holds the blade and the spring in position in respect to the yoke.

3 Claims, 7 Drawing Figures

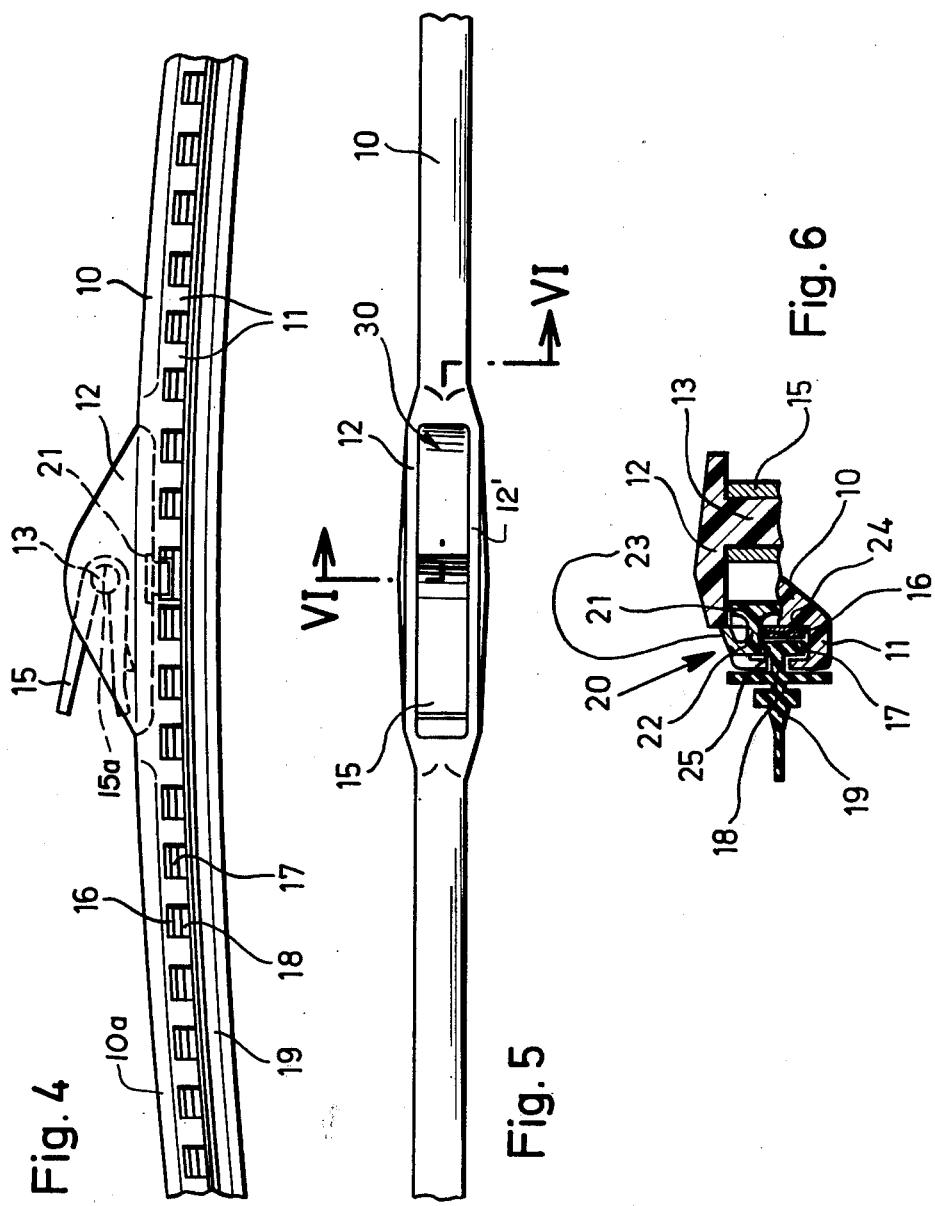

VEHICLE WIPER BLADE CONSTRUCTION

BACKGROUND OF THE INVENTION

FIELD OF THE INVENTION

This invention relates in general to the construction of wiper blades for vehicles and in particular to a new and useful wiper blade assembly including a yoke which is adapted to be supported pivotally on a wiper arm and which includes means for supporting a wiper blade therefrom between the bottom surface of the yoke and a support surface defined by support elements carried by the yoke and which further includes a locking stud which engages through a slot of the yoke and locks a wiping blade and a spring stiffener in position in respect to the yoke.

DESCRIPTION OF THE PRIOR ART

The known wiper blade constructions require the assembly of a yoke element to a blade and such constructions have the disadvantage that they are expensive to manufacture in view of the fact that they require assembly time as well as manufacture time and they are not easily adaptable to changes to meet particular installation requirements in respect to length of blade, size of yoke, etc.

SUMMARY OF THE INVENTION

In accordance with the present invention there is provided a wiper blade for wiper installations in vehicles which comprises an elastic integral plastic yoke which has an underside which is provided with means for fixing a wiper rubber or blade together with a spring bar which is inserted between the back of the wiper blade web portion and the underside of the yoke. The yoke is centrally provided with a recess having a pivot pin for hanging the assembly on a wiper arm. Such a wiper arm can be produced much cheaper than the known devices and the inserted spring bar insures that after a long use period it will be sufficient contact pressure of the wiper rubber blade to the windshield.

The present invention also particularly effects the rapid fixing of the wiper rubber and the spring bar in the plastic yoke and includes an improved clip means which is insertable into a slot of the yoke for rapidly fixing both the spring and the blade against axial displacement in respect to the yoke.

In accordance with the invention the yoke is provided with a slot which aligns over a cutout area of both the spring and the wiper blade web portion and both the spring and the wiper blade are anchored axially in respect to the yoke by insertion of a locking clip into the slot so as to project into the cut away area of both the spring and the blade and lock them in respect to axial displacement relative to the yoke. The locking member or clip member advantageously comprises a U-shaped element having laterally extending resilient leg portions with projections or studs which interengage with the yoke and which position themselves within rectangular notches or cutout areas of the spring and the wiper blade web portion to hold them in position relative to the yoke.

The yoke advantageously includes support means in the form of depending elements which extend downwardly from respective opposite sides of the yoke and which are laterally offset and define support surfaces spaced from the bottom of the yoke which accommodate a web portion of the wiper blade. The wiper blade is inserted longitudinally into the space between the support surfaces and the yoke and the blade portion extends downwardly or in a direction toward the windshield. A spring plate is then inserted into the space between the web portion of the wiper blade and the bottom of the yoke and it provides a stiffening means for the wiper blade. Thereafter the cutout areas of both the spring and the wiper blade web portion are aligned beneath the slot of the yoke and a fixing of the assembly is effected by insertion of a locking clip member into the slot. This type of fixing of the wiper rubber and the spring bar provides a possibility for producing wiper blades of different length with uniform parts. For this purpose it has only to be provided that the spring bar is constructed for the length of the shortest wiper blade and of the yokes and/or the wiper rubber blade is provided for the length of the longest wiper blade and in that the yoke and/or the wiper rubber blade is cut off to the desired wiper blade length.

A secure fixing of the wiper rubber blade and the spring bar is effected by the locking member which comprises a stop plate and two integrally formed locking stud feet which are spaced apart to define a width which corresponds to the dimensions of the slot defined in the yoke. The feet engage into the cutaway areas of each side of the spring plate and the wiper blade web and each leg portion is provided with a projecting stud which is wider than the opening in the yokes so that they must be compressed for insertion and then resiliently interengaged with the yoke after insertion.

The yoke is additionally simplified by providing a top with upstanding spaced apart side portions forming bearing walls for a central pin which advantageously overlies the slot area of the yoke. A resilient holding clip of U-shaped construction is easily engageable over the pin so that one arm will extend downwardly toward the top of the yoke and the other arm will extend upwardly and outwardly therefrom for affixing to a windshield wiper arm.

Accordingly it is an object of the invention to provide an improved wiper blade construction which includes a yoke having means for supporting a wiper blade and a spring bar on its underside and which has a slot for receiving a locking clip which engages into the slot and into a cutout area or notch of the wiper blade to hold it in position relative to the yoke.

A further object of the invention is to provide a wiper blade construction which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

FIG. 4 is a side elevational view of the wiper assembly;

FIG. 5 is a top plan view of the wiper assembly without the securing plate;

FIG. 6 is is a section taken on the line VI—VI of FIG. 5; and

GENERAL DESCRIPTION OF THE PREFERRED EMBODIMENT

Figure 1:
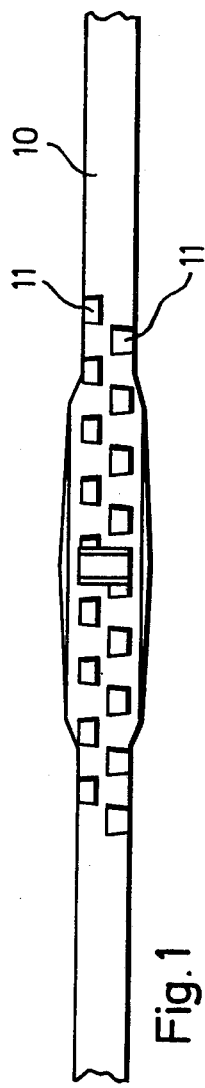
FIG. 1 (10b, 11a, 19n, 22, 23, and 23') is a partial bottom plan of a windshield wiper yoke constructed in accordance with the invention.
Figure 2:
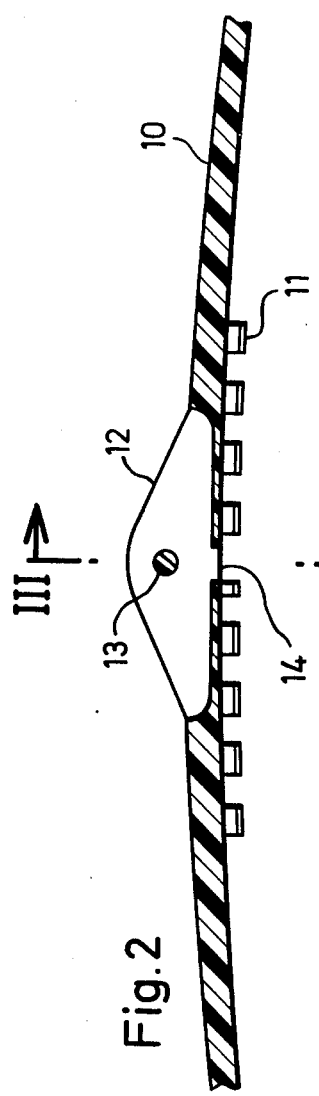
FIG. 2 is a longitudinal sectional view of the windshield wiper shown in FIG. 1.
Figure 3:
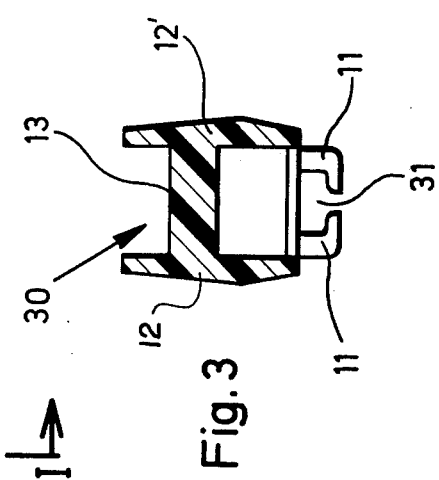
FIG. 3 is a section taken on the line III-III of FIG. 2.
Figure 7:
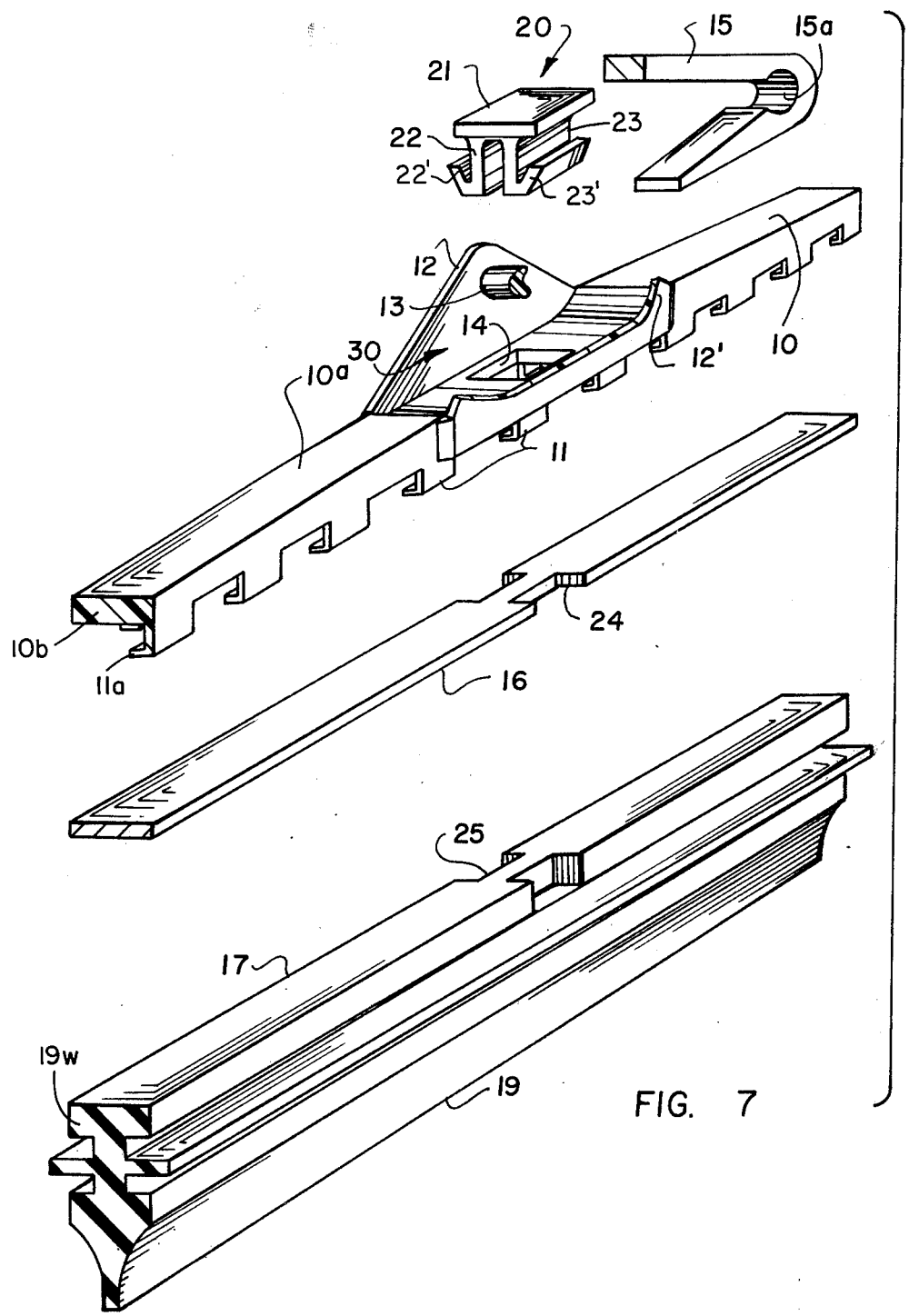
FIG. 7 is a perspective view partly in section of the wiper blade assembly.

Referring to the drawings in particular the invention embodied therein comprises integral yoke member 10 having a top wall 10a and a central area with upstanding wall portions 12 and 12' on respective sides which define a recess 30 therebetween which is bridged by a pivot pin 13 journalled in the side walls 12 and 12'. The recess 30 defines a space for receiving a two legged locking spring 15 which has a central cylindrical bearing portion 15a which engages over the pin 13. The recess 30 provides means for hanging the wiper blade assembly on a wiper arm (not shown).

The yoke 10 is advantageously made of an elastic material such as plastic and is advantageously constructed with a bottom wall 10b which is concave and it includes wiper blade support means in the form of depending elements or fixing member 11 having a horizontally extending portions 11a which define a support surface spaced from the bottom 10b of the yoke 10. The horizontal portions 11a on respective sides of the yoke 10 are spaced apart to accommodate the central portion 18 of a wiper blade generally designated 19. A web portion 19w of the wiper blade 19 extends substantially horizontally and it is supported on the horizontal support surfaces 10a below the bottom 10b. A spring plate or spring bar 16 is disposed to overlie the web portion 19w and is located between the bottom 10b of the yoke and the web portion 19w.

In order to insert the blade 19 and the spring 16 they are pushed from one end of the yoke into the space defined between the support surface 11a and the bottom 10b. In the inserted position the spring bar 16 lies on the web portion 19w and reinforces the blade 19.

In accordance with the invention the yoke 10 is provided with a slot 14 located within the recess 30 preferably under the pin or bearing support 13. In addition the spring 16 is provided with rectangular notched or cutout areas 24, 24' which align with similar cutout areas 25, 25' of the blade 19 and which also align with the slot 14. After the blade 19 and the spring 16 have been inserted into the space between the support surfaces 11a and the bottom 10b the whole assembly is locked together by insertion of a lock member or locking clip 20 through the slot 14. The locking clip 20 includes hook shaped leg portions 22 and 23 which have projections or studs 22' and 23' which project laterally outwardly so that they must be deflected inwardly when the locking member is inserted through the slot 14. The bottom faces of the legs 22 and 23 are rectangular in outline so that they engage substantially without play in the notched areas 24, 25 and 24', 25'. In this manner once the locking member 20 is inserted the spring 16 and the blade 19 are held against axial displacement in respect to the yoke 10. After insertion the projections 22' and 23' spring outwardly and engage against the underside of the yoke member and bear against the bottom surface 10b so that the lock member will not easily be removed. The lock member 20 also includes a flat top plate 21 which limits the insertion movement and which bears downwardly against the top surface 10a of the yoke 10. The length of the leg portions 22 and 23 is substantially the same as the length of the slot 14 and the notch therein 24 and 25.

The yoke 10 and the wiper rubber 19 may be made to any length. The ends of the yoke 10 do not have to be provided with any fixing means for axially securing the spring bar 16 or the wiper blade 19. This provides the possibility to build up the assembly made of the blades or yokes of different lengths. The spring bar is selected preferably so that it is of a length which is at least as long as the smallest wiper blade length and the yoke and the wiper blade itself are adapted to the maximum wiper blade length. With such a construction it is possible to obtain a custom wiper blade length by cutting the yoke 10 and the wiper blade 19 to any desired length.

Because the spring clip 15 is secured over the slot 14 it provides a further securement for the locking member 20.

While a specific embodiment of the invention has been shown and described in detail to illustrate the application of the principles of the invention it will be understood that the invention may be embodied otherwise without departing from such principles.

What is claimed is:

1. A wiper blade for wiper arm installations in vehicles, comprising a blade yoke having top and bottom surfaces and a side wall on each side of said top surface, said side walls including lower portions extending downwardly from said bottom surface and with inturned flange portions adjacent the bottom ends thereof defining wiper blade supports which extend inwardly from respective opposite sides and terminate in opposite inner edges which are spaced apart, a wiper blade having an outer blade portion and an inner flat web portion and an intermediate portion of smaller width than said web portion interconnecting said web portion and said blade portion, said web intermediate portion being positionable between opposite blade supports and said blade being insertable with said intermediate portion located between said supports from an end of said yoke so as to position said web portion between said supports and said yoke bottom, a spring bar engageable between said web portion and said bottom, said blade web portion and said spring bar being provided with laterally aligned notches extending inwardly from respective opposite sides, said yoke having an opening therethrough overlying said notches and the portions of said spring bar and said web portion between the notches, and a U-shaped locking member having laterally spaced longitudinally extending first and second leg portions engageable in the respective notches and a central connecting portion interconnecting said legs disposed over said yoke, each locking leg portion having outwardly extending parts engageable below a respective one of said yoke side walls, said leg portions locking said blade and said spring bar against longitudinal movement.

2. A wiper blade, according to claim 1, wherein said side walls of said yoke include an intermediate side wall portion extending above said top surface of each side wall, a wiper blade pivot pin extending between said intermediate side wall portions located above the opening in said yoke and a U-shaped spring clip having a central portion engageable over said pivot pin and having a leg portion overlying said locking member.

3. A wiper blade according to claim 1, wherein said locking member lower outwardly extending parts form hook-shaped engagement parts of resilient material which are bendable backwardly to release said locking member through the opening of said yoke.

* * * * *